United States Patent [19]
Sakata

[11] Patent Number: 6,085,190
[45] Date of Patent: Jul. 4, 2000

[54] APPARATUS AND METHOD FOR RETRIEVAL OF INFORMATION FROM VARIOUS STRUCTURED INFORMATION

[75] Inventor: Tsuyoshi Sakata, Yokohama, Japan

[73] Assignee: Digital Vision Laboratories Corporation, Tokyo, Japan

[21] Appl. No.: 08/970,625

[22] Filed: Nov. 14, 1997

[51] Int. Cl.[7] .................................................. G06F 17/30
[52] U.S. Cl. ................. 707/6; 707/3; 707/5; 707/10; 395/200.31; 395/200.43
[58] Field of Search ................... 707/3, 10, 5, 6, 707/100, 513; 395/200.31, 200.79; 705/26

[56] References Cited

U.S. PATENT DOCUMENTS

| | | | |
|---|---|---|---|
| 4,803,642 | 2/1989 | Muranaga | 364/244 |
| 5,606,690 | 2/1997 | Hunter et al. | 707/5 |
| 5,752,242 | 5/1998 | Havens | 707/3 |
| 5,778,360 | 7/1998 | Sugita et al. | 707/4 |
| 5,787,437 | 7/1998 | Potterveld et al. | 707/103 |
| 5,802,509 | 9/1998 | Maeda et al. | 706/59 |
| 5,826,242 | 10/1998 | Montulli | 705/27 |
| 5,826,258 | 10/1998 | Gupta et al. | 707/4 |
| 5,835,087 | 11/1998 | Herz et al. | 345/327 |
| 5,845,278 | 12/1998 | Kirsch et al. | 707/3 |
| 5,862,325 | 1/1999 | Reed et al. | 395/200.31 |

*Primary Examiner*—Jean R. Homere
*Attorney, Agent, or Firm*—Oblon, Spivak, McClelland, Maier & Neustadt, P.C.

[57] ABSTRACT

An information retrieval apparatus having a meta-data specifying section for specifying at least one attribute of information described in various forms of description, and a pattern learning section for creating rules for extracting information including the specified attribute based on the specified attribute.

13 Claims, 9 Drawing Sheets

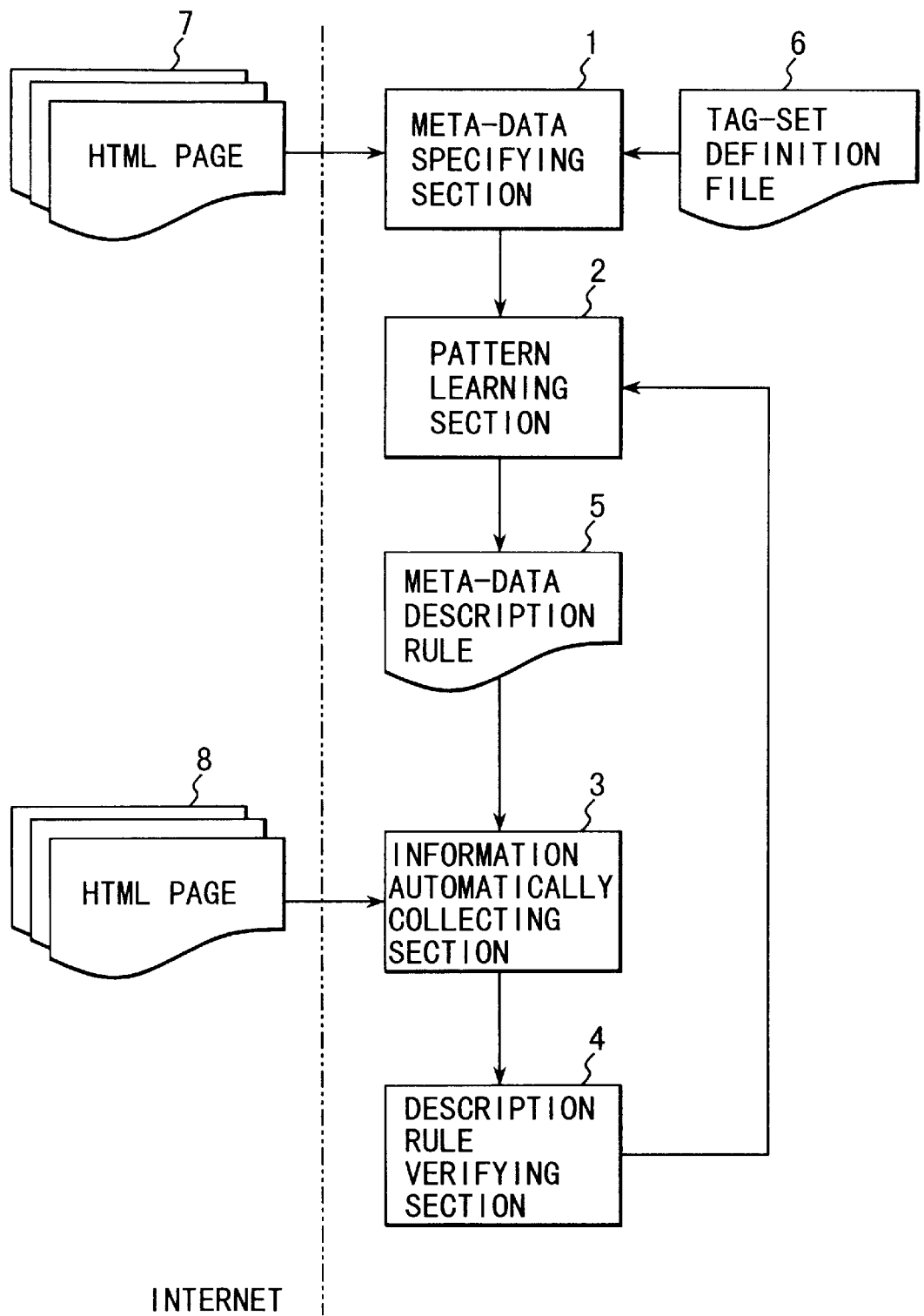
F I G. 1

CATALOGUE

| KIND | SHOP | PAYMENT | RETRIEVE |

FASHION:WOMEN'S CLOTHES

---

TURTLENECK SWEATER

| | NAME: | TURTLENECK SWEATER |
|---|---|---|
| WASHING | PRICE (INCLUDING TAX): | ¥5,900 |
| | CARRIAGE: | ¥300 |
| | MATERIAL: | WOOL 100% (WOOL MARK) |
| | | [HAND:X] [WASHING MACHINE:X] [DRY:O] |
| | COLOR: | 01 BLUE ▼ |
| | SIZE(BUST): | 02(M/102(79~87cm) LENGTH OF ONE'S DRESS 61cm ▼ |
| | QUANTITY: | 1 |

[ADD THIS GOOD TO BASKET] [CONFIRM THE ONTINTS]

---

VELOUR DOLMAN T SHIRT

| | COMMODITY NAME: | VELOUR DOLMAN T SHIRT |
|---|---|---|
| WASHING | PRICE (INCLUDING TAX): | ¥5,900 |
| | CARRIAGE: | ¥300 |
| | MATERIAL: | POLYESTER 100% |
| | | [HAND:O] [DRY:O] [WASHING MACHINE:O (USING MET)] |
| | COLOR: | 01 WINE ▼ |
| | SIZE(BUST): | 02(M/79~87cm) LENGTH OF ONE'S DRESS 70cm ▼ |
| | QUANTITY: | 1 |
| | SMART EUSVAL WEAR WITH HIGH FREEDOM OF MOVEMENT | |

FIG. 2

```
<!DOCTYPE HTML PUBLIC"-//W3C//DTD HTML 3.2//EN">
<HTML>
<HEAD>
    <TITLE>CATALOGUE:FASHION:WOMEN'S CLOTHES 1</TITLE>
    <META NAME="GENERATOR"CONTENT="Mozilla/3.01b1Gold(Win95;1)[Netscape]">
</HEAD>
<BODY BGCOLOR="#FFFFFF">

<TABLE WIDTH="100%">
<TR>
<TD ALIGN=RIGHT><I><FONT SIZE=+2>CATALOGUE</FONT></I></TD>
</TR>
</TABLE>

<CENTER><P>
<HR>|<A HREF="http://www.commerce.or.jp/cgi-bin/shopping/makeindex">KIND</A>
|<A HREF="http://www.commerce.or.jp/cgi-bin/shopping/makeshop">SHOP</A>
|<A HREF="http://www.commerce.or.jp/cgi-bin/shopping/How To Buy">PAYMENT</A>
|<A HREF="http://www.commerce.or.jp/cgi-bin/shopping/makesearch">RETRIEVE
—
<HR></P></CENTER>

<TABLE WIDTH="100%">
<TR>
<TD>
<H2><I>FASHION:WOMEN'S CILTHES</I></H2>
</TD>
```

FIG. 3A

```
<TD ALIGN=RIGHT><BR>
</TD>
</TR>
</TABLE>

<TABLE WIDTH="100%">
<TR>
<TD ALIGN=LEFT WIDTH=33%><BR>
</TD>
<TD ALIGN=CENTER WIDTH=33%></TD>

<TD ALIGN=CENTER WIDTH=33%><BR>
</TD>
</TR>
</TABLE>

<P><FORM ACTION="/cgi-bin/shopping/order.cgi"METHOD="POST">
<HR SIZE=3 NOSHADE><INPUT TYPE=HIDDEN NAME=company VALUE="DVL">
<INPUT TYPE=HIDDEN NAME=souryou VALUE="300"><INPUT TYPE=HIDDEN NAME=
keyword VALUE="FASHION:WOMEN'S COLTHES"></P>

<TABLE BORDER=1 CELLSPACING=0 WIDTH="100%">
<TR>
<TD COLSPAN=2>
<TABLE WIDTH="100%">
<TR>
<TD ALIGN=LEFT></TD>

<TD ALIGN=RIGHT></TD>
</TR>
```

```
NAME:
</TD>
<TD>
<INPUT NAME="2086-26907:title"TYPE="hidden"VALUE="TURTLENECK SWEATER">

TURTLENECK SWEATER

</TD>
</TR>
<TR>
<TD ALIGN=RIGHT NOWRAP>
```

FIG. 4B

```
COMMODITY NAME:
</TD>
<TD>
<INPUT NAME="2086-26918:title"TYPE="hidden"VALUE="VELOUR DOLMAN T SHIRT">

VELOUR DOLMAN T SHIRT

</TD>
</TR>
<TR>
<TD ALIGN=RIGHT NOWRAP>
```

```
text
</TD>
<TD>
<INPUT NAME=text TYPE="hidden"VALUE=text>

********

</TD>
</TR>
<TR>
<TD ALIGN=RIGHT NOWRAP>
```

```
<TR>
<TD ALIGN=RIGHT NOWRAP> PRICE(INCLUDING TAX):</TD>

<TD><INPUT NAME="2086-26907:price"TYPE="hidden"VALUE="¥5,900">¥5,900</TD>
</TR>
<TR>
<TD ALIGN=RIGHT NOWRAP>CARRIAGE:</TD>
```

F I G. 6

```
NAME
</TD>
<TD>
<INPUT NAME=text TYPE="hidden"VALUE=text>

*******

</TD>
</TR>
<TR>
<TD ALIGN=RIGHT NOWRAP>
```

F I G. 7A

```
COMMODITY NAME
</TD>
<TD>
<INPUT NAME=text TYPE="hidden"VALUE=text>

*******

</TD>
</TR>
<TR>
<TD ALIGN=RIGHT NOWRAP>
```

F I G. 7B

APPARATUS AND METHOD FOR RETRIEVAL OF INFORMATION FROM VARIOUS STRUCTURED INFORMATION

BACKGROUND OF THE INVENTION

The present invention relates to an information retrieval apparatus and information retrieval method in which information is provided as data bases in various formats for description. More particularly, it relates to an information retrieval apparatus and information retrieval method for information on various commodities provided by different information providers in communication such as the Internet.

Recently, selling by correspondence utilizing virtual shopping malls or shopping pages provided by computer communication or the Internet has been holding the spotlight.

However, consumers who purchase commodities through such virtual shopping malls or shopping pages encounter problems such as inability to find the commodities they want to purchase. Further, providers who provide commodities have a problem in that their customers do not come to their shops (or they do not access their home pages). The term "commodities" used here implies not only material commodities but also non-material commodities, for example, services such as programs for broadcast in cases wherein the provider of the commodities (hereinafter simply referred to as "provider") is a broadcaster.

Among the above-described problems, a consumer's inability to find commodities as a refers to situations as described below.

For example, consider situations when someone can not find a program that broadcasts a piece of music he or she wishes to listen to from among programs, or a when someone can not find a movie for which he or she wishes to watch a certain actor performing because a program table shows only general information. Also, consider a situation in which someone can not find a home page that sells a certain commodity over the Internet.

In some cases, desired commodities are not specifically identified by a consumer unlike the above-described situations, and the consumer only looks for some interesting program or just wants to know commodities which are recently popular.

From a provider's point of view, a problem arises in that a new WWW site opened on the Internet can not be found by consumers because current retrieval services on the Internet employ a system in which commodities are accessed only from the consumers' side.

Further, retrieval services on the Internet utilize techniques for full text retrieval that only allow retrieval using keywords. This results in a problem in that, for example, a red polo shirt is retrieved using the logical product of two keywords "red" and "polo shirt"; the returned result is a page on which red T shirts and yellow polo shirts are sold; and the user thus receives a result of retrieval listing commodities that he or she has not intended to find. Furthermore, conventional retrieval services do not allow someone to specify a range of numerical values, for example, 5000 yen or less because they treat keywords only as character strings.

As described above, the retrieval of commodities currently available has the problems that consumers cannot find commodities to buy, and a result of retrieval may include many commodities which are different from what is desired, because the retrieval is performed on a full text basis retrieval using keywords. Thus, providers encounter the problem that their customers do not visit their shops.

BRIEF SUMMARY OF THE INVENTION

It is an object of the invention to provide an information retrieval apparatus and information retrieval method with which consumers can quickly and easily retrieve desired commodities and, as a result, providers can provide consumers with commodities without any special effort.

According to the invention, the following means have been provided to solve the above-described problems.

According to the invention, an information retrieval apparatus comprises: meta-data specifying means for specifying at least one attribute of information described in various forms of description; and pattern learning means for creating rules for extracting information including the specified attribute based on the specified attribute, wherein the information described in various forms of description is stored in a plurality of data bases connected through the network.

Preferred embodiments of the information retrieval apparatus according to the invention are as follows.

(1) The pattern learning means creates the rules by abstracting information including the specified attribute.

(2) Information collecting means for collecting information including the specified attribute based on the rules is further provided.

(3) Verifying means for verifying whether or not the information collected based on the rules includes undesired information is further provided, wherein the pattern learning means and/or the verifying means performs a process of updating the rules based on the result of verification by the verifying means. The updating process includes a process of concretizing the attribute information.

According to the invention, an information retrieval method comprises the steps of: specifying at least one attribute of information described in various forms of description; and creating rules for extracting information including the specified attribute based on the specified attribute.

Preferred embodiments of the information retrieval method according to the invention are as follows.

(1) The step of creating rules creates the rules through a process of abstraction in which character strings that match each other are left as they are and in which character strings that do not agree with each other are converted into a variable.

(2) Information including the specified attribute is collected based on the rules, wherein a step of verifying whether or not the information collected based on the rules includes undesired information, and/or a step of performing a process of updating the rules based on the result of verification at the verifying step is further provided.

The above-described configurations allow consumers to extract desired information on commodities quickly and easily and allows retrieval of commodity information so that rules for extracting desired information on commodities can be very easily created and updated. In addition, information providers are freed from the problem that HTML pages are not seen by consumers, because an information automatically collecting means automatically collects relevant information using meta-data in the form of certain rules, and a desired page is shown by using it.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a block diagram schematically showing a configuration of an information retrieval apparatus according to an embodiment of the invention;

FIG. 2 is a view showing an example of display of an HTML page;

FIGS. 3A and 3B are views showing an example of description on an HTML page;

FIGS. 4A through 4C are views showing specific examples of a process of abstraction according to the invention;

FIG. 5 is a view showing a hierarchical diagram of the process of abstraction according to the invention;

FIG. 6 is a view showing an example of a portion erroneously retrieved according to the rule shown in FIG. 4C; and FIGS. 7A and 7B are views showing specific examples of a process of concretization according to the invention.

DETAILED DESCRIPTION OF THE INVENTION

An embodiment of the invention will now be described with reference to the drawings.

FIG. 1 is a block diagram schematically showing a configuration of an information retrieval apparatus according to an embodiment of the invention. The embodiment described below will refer to retrieval of commodities using home pages in a WWW site of the Internet (hereinafter referred to as "HTML (HyperText Markup Language) pages", whereas the invention is not limited thereto and may be applied to retrieval of commodities on networks (including the Internet and intranet) including data bases having different structures.

The apparatus for retrieving information according to the invention comprises a meta-data specifying section 1, a pattern learning section 2, an information automatically collecting section 3 and a description rule verifying section 4.

The meta-data specifying section 1 specifies meta-data from a predetermined HTML page 7 such as a shopping mall with reference to a scheme definition file 6 and outputs the specified meta-data to the pattern learning section 2. The term meta-data refers to information representing the meaning of a material (for example, a commodity) and data including attributes and attribute values of the same (for example, an attribute may be "price" and an attribute value may be the actual price).

As described later in detail, the pattern learning section 2 receives the meta-data specified by the meta-data specifying section 1, learns the pattern of the description of the meta-data, and creates meta-data description rules 5.

The information automatically collecting section 3 performs collection meta-data from on an HTML page 8 based on the meta-data description rules 5.

The description rule verifying section 4 verifies the validity of the meta-data description rules 5 based on the meta-data on the HTML page 8 collected and outputs the result to the pattern learning section 2. The pattern learning section 2 updates the meta-data description rules 5 based on the result.

The details of the apparatus for retrieving information having the above-described configuration will now be described.

For example, it is assumed that an HTML page entitled "fashion: women's clothes" as shown in FIG. 2 is specified on a catalogue. In this case, two commodities, for example, a turtleneck sweater and a velour dolman T shirt are displayed. (Commodity) names, prices, carriage, material and the like are described as attributes of these commodities. FIGS. 3A and 3B show an example of description on a part of an HTML page as shown in FIG. 2. In FIGS. 3A and 3B, the parts enclosed by <> are referred to as "tags" in which information showing the type, position and the like of the displayed data is described.

Referring to the commodities shown in FIG. 2, the specifier specifies "turtleneck-sweater" and "velour dolman T shirt" as meta-data of the attribute "commodity name" at the meta-data specifying section 1. As shown in FIGS. 4A and 4B, the meta-data specifying section 1 passes the specified values to the pattern learning section 2 with HTML texts in predetermined lengths added before and after those values.

As shown in FIG. 4C, the pattern learning section 2 performs a process such that parts that match each other between the two pieces of data are left as they are and parts that do not match are replaced with other character strings. For example, the HTML displays shown in FIGS. 4A and 4B include descriptions "name" and "commodity name", "2086-26907" and "2086-26918", and "turtleneck sweater" and "velour dolman T shirt" which are different from each other, respectively. Then, as shown in FIG. 4C, the part of character strings that do not agree with each other is replaced with a character string "text" or "******" as a character string that represents the character string (such a character string is hereinafter referred to as a "wild card"). That is, as shown in FIG. 4C, the pattern learning section 2 creates rules for the same kind of objects for retrieval by replacing a part described by different character strings with a wild card. When the same kind of objects for retrieval, include another part described differently, such a differently described part is replaced with a wild card. Thus, it continues to create rules to allow retrieval even when descriptions of different character strings are encountered. Such a process of sequentially replacing particular character strings with wild cards is referred to as a "process of abstraction". A process of replacing wild cards with actual character strings conversely is referred to as a "process of concretization".

Figure 5:
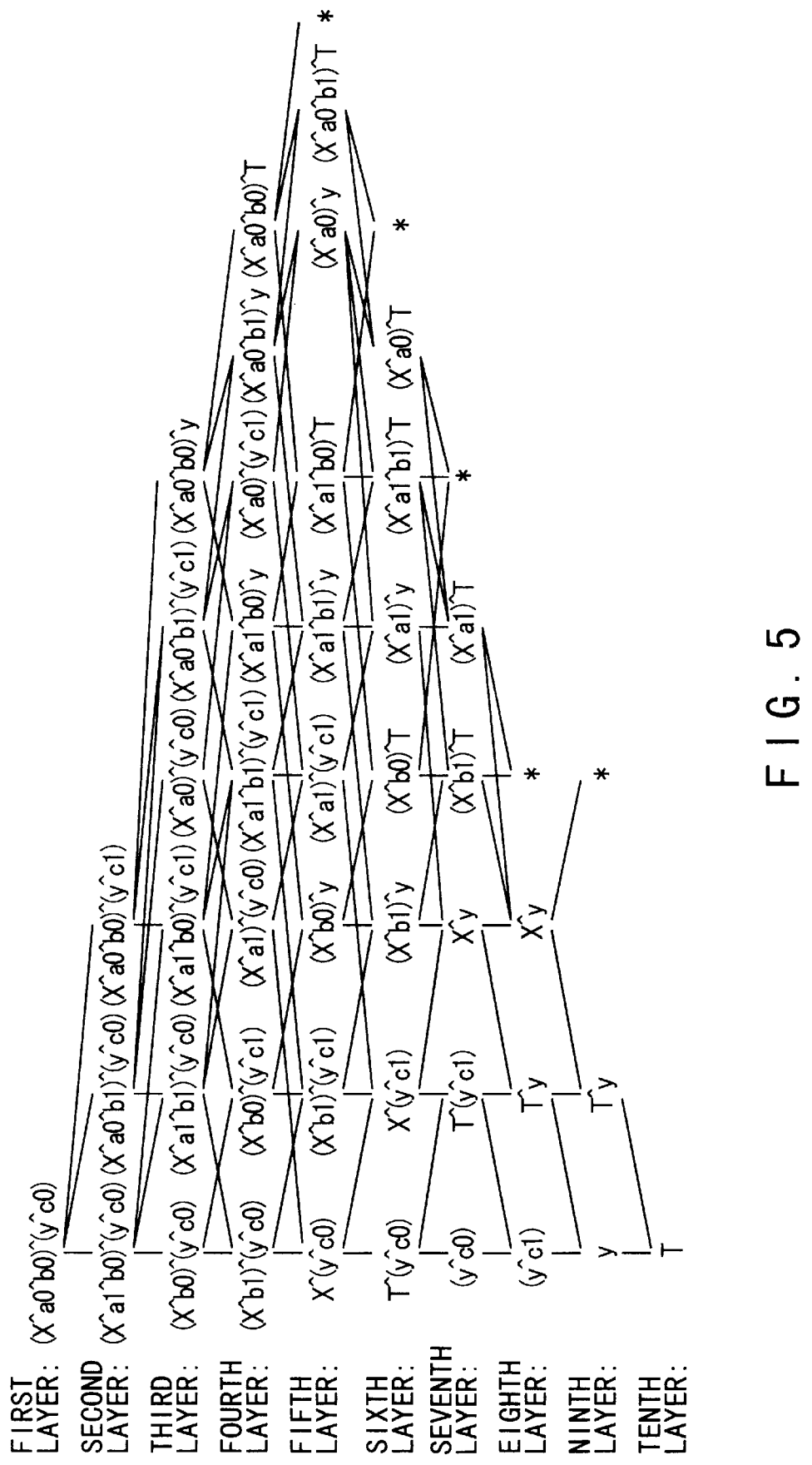

A method for the process of abstraction at the pattern learning section 2 will be described with reference to FIG. 5. FIG. 5 is a hierarchical diagram showing an example of such abstraction.

A rule (x^a0^b) shown in FIG. 5 represents a comparison rule, wherein this rule matches an HTML tag having a tag name X which includes an attribute a and an attribute b. A symbol ^ means conditions are ANDed. Parentheses () means a condition included in the parentheses is compared with a HTML tag. It is assumed a symbol a is represented as a0 in a case when the attribute a contains a specific value, and a1 in a case when the attribute a may be included regardless of specific value. A rule (x^a0^b0)^(y^c0) of the first layer is a comparison rule which matches an HTML document when the HTML document includes X tag having the attributes a and b, each of which include a predetermined value, and Y tag having the attribute c, which include a predetermined value.

Next, the process of abstraction of the comparison rule will be described.

The a1 has a lower limitation than the a0 as a comparison condition. When the a1 is abstracted, the a1 is deleted in the rule because the attribute a becomes unnecessary in the rule. The process of abstraction is performed for each of the parentheses (), a condition regarding to the attribute in the parentheses () is abstracted. Thereafter, if the comparison rule has only a tag name such as X, a condition X is deleted, because the HTML tag is unnecessary in the next process of abstraction. However, the tag can not be deleted in the following case.

In a case of performing the process of abstraction of the comparison rule having a condition having three tags X, Y and Z, which forms a train such as X^Y^Z, the comparison rule can not be abstracted as X^Z by deleting only Y. If the above process of abstraction is performed, the HTML document, which matches the comparison rule before the process of abstraction, becomes a mismatch to the comparison rule. Therefore, it is inappropriate as the process of abstraction. In this case, it is necessary that some tag exists between X and Z. In FIG. 5, this condition is represented by T. That is, by the process of abstraction of Y in the rule X^Y^Z, the rule X^Y^Z is represented by X^T^Z. In addition, in FIG. 5, the comparison rule which can not be abstracted is represented by a mark *. In FIG. 5, to simplify the explanation, a treatment of character string is omitted, the character string can be treated by placing a specific character string represented by, e.g., s, outside the parentheses () of the comparison rule.

Through a process of abstraction as described above, the pattern learning section 2 creates rules for meta-data to add new rules to the meta-data description rules 5 or to update the current rules.

In practice, once the pattern learning section 2 creates or updates the rules, the information automatically collecting section 3 actually accesses the Internet to retrieve the desired information on commodities on the HTML page 7.

However, for example, the rule for searching a "commodity name" shown in FIG. 4C has been replaced with a variable such that it accommodates both of "name" and "commodity name", and the variable also matches the part representing the price shown in FIG. 6. As a result, erroneous extraction is carried out to show that "commodity name"="5900 yen". In such a case, the description rule verifying section 4 determines that the rule associated with this retrieval is improper and provides an output to the pattern learning section 2 to indicate such a determination.

Since such a situation occurs as a result of excessive abstraction of the description of the rules, in response to the output from the description rule verifying section 4, the pattern learning section 2 performs a process of concretization which is a process reverse to the process of abstraction. The section 4 updates the rule shown in FIG. 4C by creating a rule according to which the first "text" part among the parts indicated by "text" as a wild card is split into "name" and "commodity name" as shown in FIGS. 7A and 7B, respectively. This allows the part of "price (including tax)" shown in FIG. 6 to be eliminated from the objects of retrieval because it is neither a name nor commodity name.

As described above, according to the invention, rules for extracting desired information on commodities from HTML pages are created using a process of abstraction. The desired information on commodities can be retrieved from the HTML pages based on the rules. Further, when undesired commodity information is extracted because of too abstract description of the rules, the commodity information can be reduced to bring appropriate information in focus through a process of concretization as described above.

Thus, the invention makes it possible to extract desired commodity information quickly and easily and allows retrieval of commodity information where rules for extracting desired commodity information can be very easily created and updated. In addition, since consumers can retrieve commodity information based on data extracted according to description rules, information providers are free from the problem in that commodities in needed by customers are overlooked by the customers.

The invention is not limited to the above-described embodiment.

Although the embodiment has been described as being one system that encompasses from the meta-data specifying section 1 to the description rule verifying section 4, it is possible to provide separate systems, i.e., a first system comprising the meta-data specifying section 1 and pattern learning section 2, a second system comprising the information automatically collecting section 3, and a third system comprising the meta-data specifying section 1, pattern learning section 2 and description rule verifying section 4. In this case, each of the first through third systems includes the meta-data description rules 5. Other alternative configurations are also possible.

Although the updating of rules is carried out by the pattern learning section 2 in the above-described embodiment, it may be carried out by the description rule verifying section 4.

The process of abstracting or concretizing rules is not limited to the method described above, and various methods may be used as long as they allow concretization and abstraction.

Further, although the above-described embodiment refers to retrieval of information on commodities on the Internet, the invention is not limited thereto and may be applied not only to retrieval of information on commodities but also to other kinds of information. It can be further applied to an information retrieval system wherein information is retrieved from data bases having different structures.

It is obvious that the invention may be embodied in various ways in an extent that no modification to the principle of the invention is made.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information retrieval apparatus comprising:
    meta-data specifying means for specifying at least one attribute of information from a plurality of original data described in various forms of description; and pattern learning means for creating at least one rule for extracting information including the specified attribute based on said specified attribute, wherein said pattern learning means creates said at least one rule by abstracting information including said specified attribute according to said plurality of original data, wherein one of said at least one rule may be created to recognize a plurality of different instances of information including said specified attribute.

2. An information retrieval apparatus according to claim 1, wherein said information described in various forms of description is stored in a plurality of data bases connected through the network.

3. An information retrieval apparatus according to claim 1, further comprising information collecting means for collecting information including said specified attribute based on said rules.

4. An information retrieval apparatus comprising:

meta-data specifying means for specifying at least one attribute of information described in various forms of description;

pattern learning means for creating miles for extracting information including the specified attribute based on said specified attribute;

information collecting means for collecting information including said specified attribute based on said rules; and verifying means for verifying whether or not said information collected based on said rules includes undesired information.

5. An information retrieval apparatus according to claim 4, wherein said pattern learning means performs a process of updating the rules based on the result of verification by said verifying means.

6. An information retrieval apparatus according to claim 5, wherein said updating process includes a process of concretizing said attribute information.

7. An information retrieval apparatus according to claim 4, wherein said verifying means performs a process of updating the rules based on the result of verification by said verifying means.

8. An information retrieval apparatus according to claim 7, wherein said updating process includes a process of concretizing said attribute information.

9. An information retrieval method comprising the steps of:

specifying at least one attribute of information from a plurality of original data described in various forms of description; and creating rules for extracting information including the specified attribute based on said specified attribute, wherein said step of creating rules creates said rules through a process of abstraction in which character strings that match each other are left as they are and in which character strings that do not match each other are converted into a variable.

10. An information retrieval method according to claim 9, wherein information including said specified attribute is collected based on said rules.

11. An information retrieval method comprising the steps of:

specifying at least one attribute of information described in various forms of description;

creating rules for extracting information including the specified attribute based on said specified attribute, the information including said specified attribute being collected based on said rules; and verifying whether or not said information collected based on said rules includes undesired information.

12. An information retrieval method according to claim 11, further comprising a step of performing a process of updating the rules based on the result of verification at said verifying step.

13. An information retrieval apparatus according to claim 1, wherein said pattern learning means performs an abstraction processing in which character strings that match each other are left as they are and in which character strings that do not match each other are converted into a variable.

* * * * *

UNITED STATES PATENT AND TRADEMARK OFFICE
CERTIFICATE OF CORRECTION

PATENT NO. : 6,085,190

DATED : July 4, 2000

INVENTOR(S): Tsuyoshi SAKATA

It is certified that an error appears in the above-identified patent and that said Letters Patent is hereby corrected as shown below:

On the title page, item [30], the Foreign Application Priority Data has been omitted. It should read as follows:

--[30] Foreign Application Priority Data

Nov. 15, 1996     [JP]    Japan............8-304840--

Signed and Sealed this

Tenth Day of April, 2001

Attest:

NICHOLAS P. GODICI

Attesting Officer     Acting Director of the United States Patent and Trademark Office